June 22, 1948. M. M. SEELOFF 2,443,965
CONTROL OF FLASH BUTT WELDERS
Filed Feb. 3, 1945
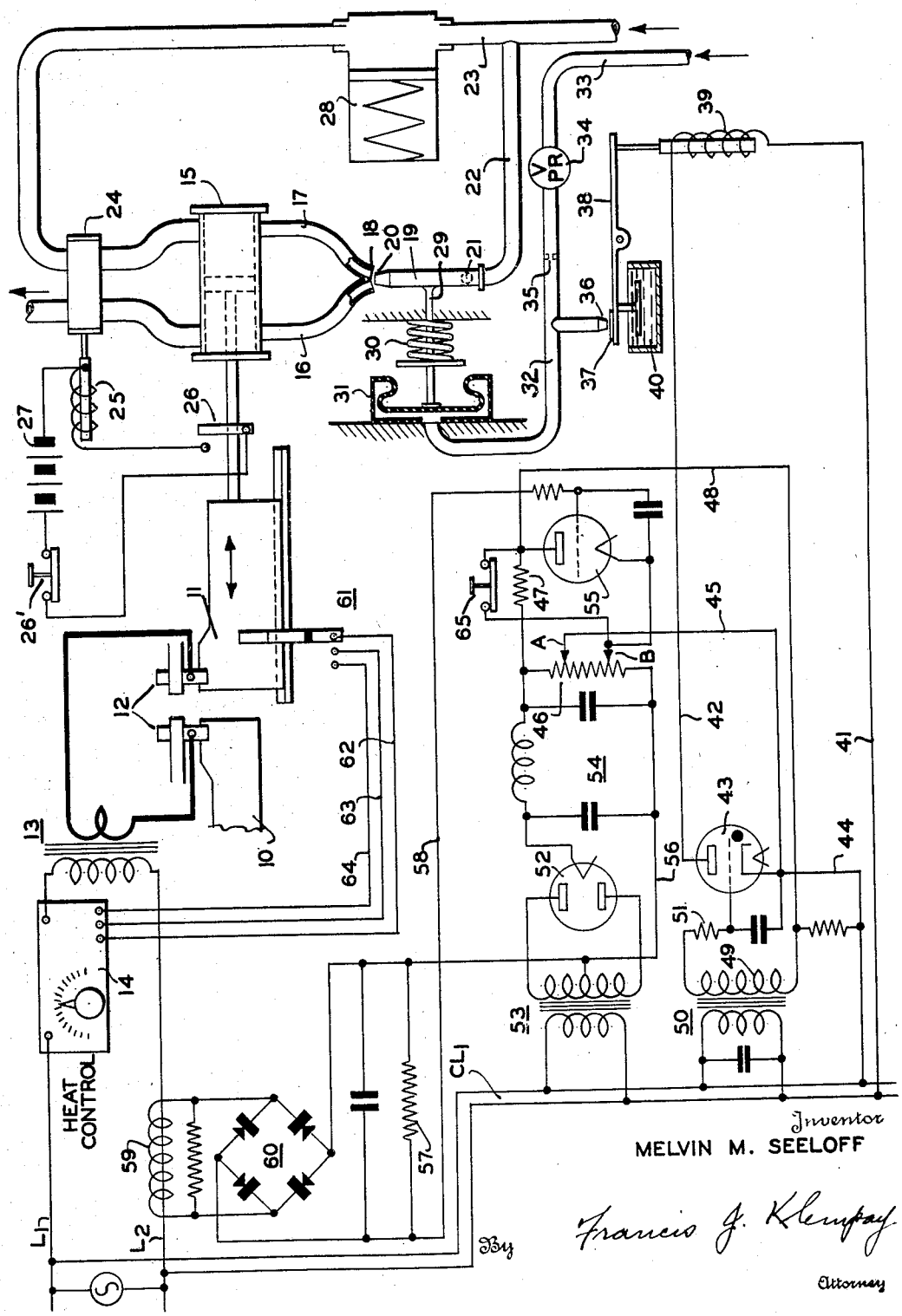
Inventor
MELVIN M. SEELOFF
By Francis J. Klempay
Attorney Patented June 22, 1948

2,443,965

UNITED STATES PATENT OFFICE 2,443,965

CONTROL OF FLASH BUTT WELDERS

Melvin M. Seeloff, Warren, Ohio, assignor to The Taylor-Winfield Corporation, Warren, Ohio, a corporation of Ohio Application February 3, 1945, Serial No. 575,971

12 Claims. (Cl. 219—4)

1

This invention relates to electric resistance welding apparatus and more particularly to improved arrangements in such apparatus for moving the work pieces and/or electrodes relative to each other. In flash-butt welding machines particularly it is highly desirable to employ a platen moving and force applying device which is smooth in operation yet highly sensitive to variations in controlling reference conditions whereby the device may be utilized to effect optimum continuing flashing conditions under either manual or automatic control. In such apparatus it is desirable that all backlash in the drive be eliminated to avoid erratic forward movement of the platen particularly during flashing and to avoid any delay in changes in the character of movement of the platen in response to any variation in the controlling reference condition. In spot and seam welding apparatus it is desirable that the means employed to move and apply welding force to the electrodes be capable of precise and instantaneous control whereby the welding force may be readily controlled and that if it is desired to increase the welding force during the welding cycle such increase may be quickly effected without the normally attendant surging action of any of the movable parts of the assembly.

The above objects are accomplished by the present invention by employing a double acting fluid motor for effecting relative movement between the work pieces and/or welding electrodes and for applying the welding forces therethrough, maintaining both opposing chambers of the motor filled with fluid under pressure substantially at all times, and proportioning a fluid stream impinging against ports leading to said chambers. Further, sensitive air-balanced relay means may be used to determine the position of said stream whereby the element driven by said motor may be made to move or to vary the force transmitted quickly and accurately in response to changes in some reference condition.

A further and more specific object of the invention is the provision in a flash-butt welder of an improved system for governing the relative movement of the work pieces during the flashing period whereby such movement may be made automatically responsive to flashing conditions and whereby the apparatus required for such operation is substantially simplified.

The above and other objects and advantages of the invention will become apparent upon consideration of the following detailed specification and the accompanying drawing wherein there is disclosed a representative embodiment of the invention.

The single figure of the drawing is a schematic representation of an electric resistance flash welding machine constructed according to the principles of the invention.

Referring to the drawing, reference numerals 10 and 11 represent normally fixed and movable platens, respectively, of an electric resistance flash-butt welding machine and, in accordance with usual practice, each platen is provided with a stock clamp 12 to hold the stock pieces in proper position for welding. Suitable electrodes are provided to conduct welding current to the clamped stock pieces and, as shown, such electrodes are electrically connected to the secondary of a welding transformer 13. The primary of transformer 13 is arranged to be energized from a suitable current source comprising the line conductors L1 and L2. Interposed in the supply circuit leading to the transformer 13 is a control system, shown schematically at 14, the normal functions of which are the control of the strength of current both during flashing and during upset and the cutting off of the current upon completion of the upsetting operation. While the details of the system 14 form no part of the present invention, the same is preferably of the kind employing electronic switching devices and adjustable phase shifting circuits to control the conduction in the devices.

Movable platen 11 is arranged to be moved by a piston contained within a double acting cylinder 15. A conduit 16 leads to the rod end of cylinder 15 while a second conduit 17 leads to the opposite end thereof. At their inlet ends the passages through conduits 16 and 17 are brought into close proximity with each other, being separated by a knife-like wall 18. A rapidly moving stream of fluid under pressure, preferably hydraulic fluid, is directed against the inlets of the conduits 16 and 17 by a jet-tube 19 having a nozzle 20 positioned adjacent the outer edge of dividing wall 18. Tube 19 is pivotally mounted at 21 and it should be apparent that the direction and speed of movement of the piston in cylinder 15 will be dependent on the position of the tube 19. If tube 19 is so moved as to move nozzle 20 to the right a greater pressure will be built up in the head end of cylinder 15 and consequently the piston and platen 11 will be moved to the left—the speed of such resulting movement being determined by the pressure differential in opposite ends of the cylinder. The greater the movement of tube 19 the greater will be this pressure differential.

It should be observed, however, that the arrangement insures the continuance of fluid pressure in both ends of the cylinder and insures a smooth transition from equalized to unbalanced pressures and vice versa so that the resulting movement of platen 11 will be uniformly smooth which is an especially desirable characteristic in flash welder operation.

Fluid under pressure is supplied to the tube 19 by a conduit 22 leading from a suitable source 23. To provide for the abrupt movement of the platen as is required at time of upset, I employ additional and larger conduits leading to either end of the cylinder 15 from a valve 24. Valve 24 is arranged to be actuated by a solenoid 25 which derives its operating energy from a circuit including the current source 27 and the switches 26 and 26¹, all in series. Valve 24 is provided with an inlet port having a conduit connection with an accumulator 28 arranged to be charged from the source 23. Valve 24 is also provided with an outlet or discharge port and the nature of the valve is such that when solenoid 25 is de-energized all the ports are blocked but when solenoid 25 is energized the inlet port communicates with the port leading to the head end of cylinder 15 while the port in communication with the rod end of the cylinder 15 is connected to the discharge port. In this manner the valve 24, when not actuated, cannot interfere with the control of the movement of the piston in cylinder 15 by the position of tube 19 and, when actuated, is operative to effect abrupt forward movement of the platen 11 irrespective of the position of the tube 19. It should be understood, of course, that the openings in conduits 16 and 17 are much smaller than the openings in valve 24 and in the conduits interconnecting valve 24 with cylinder 15 so that the leakage through conduits 16 and 17 will have little effect upon the movement of the piston upon dumping of the charge in the accumulator 28 by the valve 24.

As indicated, switch 26 is actuated in response to forward movement of the platen 11 and, in practice, the operating point of switch 26 is adjustable so that the extent of burn-off of the stock before upset may be controlled. Switch 26¹ is manually operated and normally closed and is provided for the purpose of releasing solenoid 25 thereby allowing fluid issuing from tube 19 to retract platen 11 following completion of a welding cycle.

Tube 19 is swung about pivot 21 by an actuating rod 29 which is biased to the left by a spring 30 and to the right by fluid pressure (preferably air) contained within a bellows 31. Fluid under pressure is furnished the bellows 31 from a suitable source 33 through a pressure regulating valve 34, a restricting orifice 35, and conduit 32. The pressure in conduit 32 and consequently in bellows 31, however, is controlled by a movable valve 37 covering a bleeder port 36 leading from the conduit 32. It should be apparent that if valve 37 is closed pressure will build up in bellows 31 to move tube 19 to the right thereby moving platen 11 in a forward direction. Upon the valve 37 withdrawing from port 36 the pressure in bellows 31 drops and tube 19 moves to the left to slow down, arrest or reverse the movement of platen 11 depending on the extent of opening of valve 37. Thus, tube 19 floats within a fairly narrow range of movement with the median of such range coinciding with the outer edge of wall 18.

While it is within the contemplation of this invention that the relay control as represented by the valve 37 may be actuated mechanically, electrically, or manually, and in accordance with a predetermined time-position pattern or otherwise, I preferably utilize the control instrumentalities thus far described to govern the movement of the platen 11 in accordance with instantaneous flashing conditions whereby continuing optimum flashing action may be automatically effected. Thus I may govern the movement of the platen 11 in accordance with an electrical condition of the work cleft or in accordance with current conditions in the primary circuit of the welding transformer which reflect the condition of the arc. If the arc tends to extinguish, the secondary circuit resistance rises and less primary current is drawn whereas if the flashing work pieces approach each other too closely excessive current is drawn. In the system illustrated the movement of platen 11 is so controlled that optimum arc length as determined by primary current strength is automatically maintained. This system will now be described.

Valve 37 is carried by a pivotally mounted beam 38 to which is connected the armature of a solenoid 39 tending to rock beam 38 in a direction to close valve 37. To the opposite end of beam 38 is connected a depending dampening vane immersed in an oil bath 40. Thus the pull of solenoid 39 is balanced against the force created by the air issuing from the port 36 although it should be understood that a balanced valve structure may be substituted for the ports 36, 37 and other means, as additional weight on the dampening vane, may then be employed to oppose the pull of solenoid 39. Solenoid 39 is controllably energized from a current supply line CL1, leading from the principal source L1, L2, through a circuit including conductors 41, 42, 44 and a controlled gaseous discharge device 43. The latter serves not only as a means for modulating the strength of current furnished the solenoid 39 but also as a means for rectifying this energizing current.

Conduction in tube 43 is controlled by a circuit which may be traced from the cathode of the tube through conductor 45 to adjustable tap A on resistor 46, the upper portion of resistor 46, resistor 47, conductor 48, secondary 49 of a phase shifting transformer 50, and current limiting resistor 51 to the control grid of tube 43. The biasing component thus furnished by the voltage drop across the upper portion of resistor 46 is positive, it being observed that a potential is normally maintained on resistor 46 by a rectifier 52 drawing current from the line CL1 through transformer 53. A filter 54 smoothes the output of rectifier 52. The potential drop across resistor 47, which is in opposition to the drop across the upper portion of resistor 46 in the biasing circuit above outlined, is determined by conduction in the controlled space discharge device 55 the anode of which is connected to conductor 48 while the cathode is connected to an adjustable tap B on resistor 46. Since point B is more negative than point A the potential developed across resistor 47 can approach and exceed the drop across the upper portion of resistor 46 in which case tube 43 will pass less and less current and, if necessary, be driven to cut-off. The output of transformer 50 is delayed approximately 90 electrical degrees with respect to the voltage wave in line CL1.

Conduction in tube 55 may be made responsive to flashing conditions at the welder and, as explained above, such conditions may be sensed by determining the strength of current flowing in the primary winding of the welding transformer.

Accordingly, I provide a resistor 57 in the grid circuit of tube 55 and develop across this resistor 57 a potential proportionate to the strength of the primary current. Such grid circuit may be traced from the cathode of tube 55 through adjustable tap B, the lower portion of resistor 46 (providing a negative component), conductor 56, resistor 57, conductor 58, and a suitable current limiting resistor to the control grid of tube 55. Resistor 57 is connected across the output of a rectifier 60 the input of which is connected to the secondary winding of a current transformer 59 which has as its primary a conductor leading to one of the terminals of the primary of the welding transformer.

In flash-butt welding apparatus it is frequently desirable to automatically reduce the voltage applied to the welding transformer upon completion of the flashing or at point of upset and to cut off the welding current entirely upon completion of upset. These functions may be accomplished by the circuits 62—63 and 62—64, respectively, which are closed in sequence by the switch 61 having an operating member carried by the platen 11 and which are connected into the control assembly 14. In practice, switch 61 is adjustable to compensate for variations in length of burn-off and upset. It should be understood that assembly 14 will be provided with suitable phase shifting circuits or other suitable control arrangements whereby the welding current may be first reduced and finally cut off in accordance with requirements.

Shunted across tube 55 is a normally closed switch 65 so that normally the potential of tap B is applied to the control grid of tube 43 to hold the latter non-conducting. This allows valve 36—37 to remain open and the spring 30 to hold jet 20 opposite the entrance to conduit 16. The platen 11 is thus retained in retracted position. When it is desired to make a weld the work pieces are clamped in the platens 10 and 11 and the control 14 is adjusted for the proper heat required for the work at hand and the switch 65 is opened. Immediately tube 43 is conditioned for maximum conduction to energize solenoid 39 and close valve 36—37 whereby pressure builds up in bellows 31 to shift tube 19 to the right thereby admitting fluid into the head end of cylinder 15 to advance platen 11. As the arc is struck, current begins to flow in conductor 12 and, modulated in accordance with the strength of this current, is the positive component of biasing potential developed across resistor 57. Tube 55 begins to conduct at a corresponding rate to modulate the output of tube 43 in the manner described above. A sensitive balance is thus established at the valve 36—37 and the "following" action of the jet tube controls the movement of platen 11 to maintain optimum flashing conditions. For example, if the arc becomes too short or if the work pieces contact each other excessive current flows in conductor L2 to drive the control electrode of tube 43 highly negative thereby slowing or interrupting forward movement of platen 11 or even reversing such movement as the needs dictate. The flashing continues under such automatic control until the desired amount of material is burned off the work pieces at which time, switch 26 is closed to dump the fluid in accumulator 28 into the head end of cylinder 28 to effect a quick upsetting movement of the platen 11. Simultaneously circuit 62—63 is closed to reduce the voltage applied to the welding transformer and, of course, upon actuation of valve 24 the position of jet tube 19 has little or no effect on the operation of cylinder 15.

Upon completion of upset, switch 61 closes circuit 62—64 to interrupt entirely the flow of current in the primary of the welding transformer. The work pieces may now be unclamped and by depressing switch 26¹ valve 24 re-centers to allow fluid issuing from jet 20 to retract the platen 11. The machine is thus recycled preparatory to the next succeeding welding operation.

The above specifically described embodiment of the invention should be considered as illustrative only as obviously many changes may be made therein without departing from the spirit, or scope of the invention. For example, the open jet proportioning means 18, 20 may be readily replaced with an enclosed proportioning valve and, as explained above, the disk valve 36, 37 may readily be replaced by a balanced valve preferably of the spool type as will be understood.

The particular control mechanism connected to the air bleeder or pilot valve will be determined primarily by the nature of the control it is desired to exercise over the movement of the platen particularly during flashing. Such control may be manual in which case the pilot valve may be mounted directly on the platen and a direct manually engageable operating lever provided, electrical of which the present detailed embodiment is representative, or mechanical wherein a time controlled cam may be employed to actuate the pilot valve. Also, as explained above, various features of the invention are applicable to electric resistance welding systems of the spot and seam welding types. Reference should therefore be had to the appended claims in determining the scope of the invention.

What I claim is:

1. In electric flash welding apparatus having a normally fixed work holding platen and a movable work holding platen as well as a welding transformer having its secondary adapted to be electrically connected to the work pieces held in said platens; the combination of means to move said movable platen comprising a double acting cylinder having a piston connected to said movable platen, conduits having adjacent inlet ports to conduct fluid under pressure into opposite ends of said cylinder, a movable jet-tube having its discharge end positioned opposite said inlet ports whereby fluid under pressure is supplied to said ports in proportions determined by the position of said jet-tube whereby the direction and speed of movement of said movable platen may be controlled, and means to conduct fluid under pressure into the opposite end of said jet-tube.

2. In electric flash welding apparatus having a normally fixed work holding platen and a movable work holding platen as well as a welding transformer having its secondary adapted to be electrically connected to the work pieces held in said platens; the combination of means to move said movable platen either toward or away from said normally fixed platen comprising a double acting fluid pressure motor having a pair of opposed expansible chambers each having an inlet port, said inlet ports being adjacent to each other, means to deliver an impinging stream of fluid against said ports, and means to change the alignment of said stream with respect to said ports whereby the relative pressures in said chambers may be controlled to control the movement of said movable platen.

3. In electric flash welding apparatus having means to conduct welding current to the work pieces to be welded, means to move said work pieces relative to each other comprising a double-acting fluid motor having a pair of opposed expansible chambers each having an inlet port, said ports being adjacent to each other, means to deliver an impinging stream of fluid against said ports, and means to change the alignment of said stream with respect to said ports whereby the relative pressures in said chambers may be controlled comprising an air motor, a movable control member, and a bleeder valve operated by said control member in control of the operation of said air motor.

4. In electric flash welding apparatus having means to conduct welding current to the work pieces to be welded, means to move said work pieces relative to each other comprising a double acting fluid motor having a pair of opposed expansible chambers each having an inlet port, means establishing a fluid stream, and means to proportion said stream between said ports whereby the relative pressures in said chambers and consequently the relative movement of said work pieces may be controlled.

5. In electric flash welding apparatus having means to conduct welding current to the work pieces to be welded, means to move said work pieces relative to each other comprising a double acting fluid motor having a pair of opposed expansible chambers each having an inlet port, means establishing a fluid stream, and means movable automatically in response to flashing conditions to proportion said stream between said ports whereby the relative movement of said work pieces may be controlled in such manner as to automatically maintain optimum flashing condition.

6. In electric flash welding apparatus having means to conduct welding current to the work pieces to be welded, means to move said work pieces toward each other comprising an expansible chamber fluid motor having an inlet port, means establishing a fluid stream, a movable member to determine the proportion of said stream impinging against said port, and means to control the movement of said member comprising a solenoid and means to vary the energization of said solenoid in accordance with fluctuations in the welding current.

7. In electric flash welding apparatus having means to conduct welding current to the work pieces to be welded and means to move said work pieces relative to each other; the combination of a solenoid in control of said means to move, and means to vary the energization of said solenoid in accordance with fluctuations in the welding current during the flashing period.

8. In electric resistance welding apparatus having relatively movable electrodes and means to conduct welding current to said electrodes; the combination of means to effect relative movement between said electrodes comprising a double acting fluid motor having a pair of opposed expansible chambers, means to maintain fluid under pressure in each of said chambers, said last mentioned means being operative to vary the relative pressures in said chambers whereby the character of said relative movement may be controlled, and means responsive to the strength of welding current and connected to said last mentioned means to control said last mentioned means.

9. In electric resistance welding apparatus having relatively movable electrodes and means to conduct welding current to said electrodes; the combination of means to effect relative movement between said electrodes comprising a double acting fluid motor having a pair of opposed expansible chambers, means to conduct the fluid under pressure into each of said chambers including a valve to proportion the flow of fluid relative to said chambers, an air motor in control of the operation of said valve, and a pilot valve in control of the operation of said air motor.

10. Apparatus according to claim 9 further including a solenoid for operating said pilot valve, and means to energize said solenoid in response to variations in the current conducted by said electrodes.

11. In electric resistance welding apparatus having relatively movable work engaging electrodes and means to conduct welding current to said electrodes; the combination of means to effect relative movement between said electrodes comprising a fluid motor having an expansible chamber and being operative upon admission of fluid under pressure into said chamber to move said electrodes relatively toward each other, an inlet port to said chamber, means establishing a fluid stream under pressure, and means to vary the degree of coincidence by the said stream and said port, whereby the effective pressure in said chamber may be controlled.

12. Apparatus according to claim 11 further characterized in that said means to vary includes a solenoid, and means to control the energization of said solenoid in accordance with variations in the current flowing through said electrodes.

MELVIN M. SEELOFF.

REFERENCES CITED

The following references are of record in the file of this patent:

UNITED STATES PATENTS

| Number | Name | Date |
|---|---|---|
| 1,562,204 | Carlstedt | Nov. 17, 1925 |
| 1,957,759 | Coates et al. | May 8, 1934 |
| 1,983,781 | Shippy | Dec. 11, 1934 |
| 2,089,213 | Labodie | Aug. 10, 1937 |

FOREIGN PATENTS

| Number | Country | Date |
|---|---|---|
| 280,659 | Great Britain | Nov. 24, 1927 |